(12) United States Patent
Nie

(10) Patent No.: US 10,983,140 B2
(45) Date of Patent: Apr. 20, 2021

(54) PIEZOELECTRIC ACCELERATION SENSOR

(71) Applicant: FATRI UNITED TESTING & CONTROL (QUANZHOU) TECHNOLOGIES CO., LTD., Quanzhou (CN)

(72) Inventor: Yongzhong Nie, Quanzhou (CN)

(73) Assignee: FATRI UNITED TESTING & CONTROL (QUANZHOU) TECHNOLOGIES CO., LTD., Quanzhou (CN)

( * ) Notice: Subject to any disclaimer, the term of this patent is extended or adjusted under 35 U.S.C. 154(b) by 0 days.

(21) Appl. No.: 16/609,579

(22) PCT Filed: May 10, 2018

(86) PCT No.: PCT/CN2018/086266
§ 371 (c)(1),
(2) Date: Oct. 30, 2019

(87) PCT Pub. No.: WO2019/200634
PCT Pub. Date: Oct. 24, 2019

(65) Prior Publication Data
US 2020/0064366 A1 Feb. 27, 2020

(30) Foreign Application Priority Data

Apr. 20, 2018 (CN) .......................... 201810361206.5

(51) Int. Cl.
*G01P 15/09* (2006.01)
(52) U.S. Cl.
CPC .................... *G01P 15/09* (2013.01)
(58) Field of Classification Search
CPC ............................ G01P 15/09; G01P 15/0915
(Continued)

(56) References Cited

U.S. PATENT DOCUMENTS

2007/0008642 A1 1/2007 Kuwahata
2020/0174034 A1* 6/2020 Nie .................. G01P 15/18

FOREIGN PATENT DOCUMENTS

CN 200947710 Y 9/2007
CN 203164200 U 8/2013
(Continued)

OTHER PUBLICATIONS

Chinese National Intellectual Property Administration, Notification of Third Office Action dated May 25, 2020 in connection with Chinese Patent Application No. 2018103612065.
(Continued)

*Primary Examiner* — Tarun Sinha
(74) *Attorney, Agent, or Firm* — Amster, Rothstein & Ebenstein LLP

(57) ABSTRACT

A piezoelectric acceleration sensor provided by the present invention comprises: a housing, wherein the housing is internally molded with an installation chamber, and one side face of the housing is provided with a cable connector; an adjustment structure, configured to adjustably connect the housing position to a to-be-measured object, so as to adjust the relative position between the to-be-measured object and the cable connector; and a charge output structure, installed in the installation chamber and configured to induce vibration and output electric signals, wherein the charge output structure is electrically connected with the cable connector. Through the adjustment structure, the housing position can be adjustably connected to the to-be-measured object, such that the cable connector keeps away from the position of obstacles, and the position of the cable connector can be flexibly adjusted, thereby facilitating installation.

9 Claims, 3 Drawing Sheets

(58) Field of Classification Search
USPC ...................................................... 73/514.34
See application file for complete search history.

(56)  References Cited

FOREIGN PATENT DOCUMENTS

| CN | 204945163 U | 1/2016 |
|---|---|---|
| CN | 206650178 U | 11/2017 |
| CN | 206906417 U | 1/2018 |
| CN | 107688102 A | 2/2018 |
| CN | 207215145 U | 4/2018 |

OTHER PUBLICATIONS

Zhao L C et al., "The Influence of Installation Manner of Transducer on Vibration Measure Characteristic of Bearings,", Bearing vol. 1, 2003, ISSN 1000-3762, CN41-1148/TH.
PCT International Search Report dated Jan. 3, 2019 in connection with PCT International Patent Application No. PCT/CN/2018/086266.
PCT Written Opinion of the International Searching Authority dated Jan. 3, 2019 in connection with PCT International Patent Application No. PCT/CN/2018/086266.
Zhao, Lian-Chun et al., "The Influence of Installation Manner of Transducer on Vibration Measure Characteristic of Bearings," Bearing, vol. 1, 2003, 4 pages.
Chinese First Office Action dated May 14, 2019 in connection with Chinese Patent Application No. 201810361206.5.
Chinese Second Office Action dated Dec. 13, 2019 in connection with Chinese Patent Application No. 201810361206.5.

\* cited by examiner

PIEZOELECTRIC ACCELERATION SENSOR

CROSS-REFERENCE TO RELATED APPLICATIONS

This application is a U.S. national stage entry under 35 U.S.C. § 371 of PCT International Patent Application No. PCT/CN2018/086266, filed May 10, 2018, which claims priority to Chinese Patent Application No. 201810361206.5, filed Apr. 20, 2018, the contents of which are incorporated herein by reference in their entirety.

TECHNICAL FIELD

The present invention relates to the technical field of sensors, and in particular to a piezoelectric acceleration sensor.

BACKGROUND ART

A piezoelectric sensor is assembled from various structures of different materials. Output signals of the piezoelectric sensor is in direct proportion to vibration acceleration suffered by a system, therefore, an overall contact stiffness of the system is insufficient due to the assembly from various structures of different materials, such that frequency response characteristics and resonance of the piezoelectric sensor are relatively low, thereby influencing reliability of output signals.

In order to realize installation of piezoelectric ceramics, a base and a mass block in a circular shear piezoelectric acceleration sensor, a manner of epoxy adhesive bonding is commonly adopted now. By adopting such a manner, although the problem of bonding between the piezoelectric ceramics and the base is solved, a higher requirement is put forward for the quality of epoxy glue between connecting layers and for the operation, for example, if the epoxy glue contains impurities or if bubbles are generated during operation, overall stiffness of products will be insufficient, then the overall stiffness of the sensor will be lowered, and frequency response characteristics will be influenced, in addition, the adhesion process requires a longer roasting time, then the installation period is rather long.

Chinese patent document CN107688102A discloses a charge output element and a circular shear piezoelectric acceleration sensor, wherein the charge output element includes: a base which includes a supporting part and a cylindrical connecting part arranged on the supporting part, wherein the connecting part is provided with installation holes formed through axial extension along the connecting part; a piezoelectric element, sleeved outside the connecting part, wherein a circular gap is formed between the piezoelectric element and the connecting part; a mass block, sleeved outside the piezoelectric element and arranged above the supporting part in a suspended manner; pretightening pieces, configured to be inserted into the circular gap, wherein the pretightening pieces are circularly distributed within the circular gap, the pretightening piece includes a first end and a second end which are opposite to each other, the second end is close to the supporting part, and the thickness of the first end is larger than the thickness of the second end; and a fastening piece which includes a cylindrical part and a stopping part which are connected with each other mutually, wherein the cylindrical part cooperates with the installation hole to lock each of the above elements, the stopping part butts against the first end, such that the pretightening piece provides a radial pretightening force to fasten the piezoelectric element, the mass block and the base. The sensor in the prior art is installed along a vertical direction, the outgoing end is at the uppermost position of the sensor, and the outgoing position cannot be adjusted, therefore, normal use is influenced when an obstacle is confronted.

SUMMARY OF THE INVENTION

Therefore, the technical problem to be solved in the present invention is to overcome the defect that the outgoing position of a piezoelectric acceleration sensor in the prior art cannot be adjusted, so as to provide a piezoelectric acceleration sensor with adjustable outgoing positions.

In order to solve the above technical problem, the present invention provides a piezoelectric acceleration sensor, including:

a housing, wherein the housing is internally molded with an installation chamber, and one side face of the housing is provided with a cable connector;

an adjustment structure, configured to adjustably connect the housing position to a to-be-measured object, so as to adjust the relative position between the to-be-measured object and the cable connector; and a charge output structure, installed in the installation chamber and configured to induce vibration and output electric signals, wherein the charge output structure is electrically connected with the cable connector.

The adjustment structure is configured to lock the housing and the to-be-measured object after the housing rotates to a target position relative to the to-be-measured object.

An axial direction of the charge output structure is set to be in parallel with an axial direction in which the housing rotates.

The to-be-measured object is provided with a threaded hole;

the adjustment structure includes:

a first installation hole and a bolt arranged on the housing, wherein the bolt is applicable to penetrate through the first installation hole to be connected with the threaded hole in a matching manner, the housing rotates around the bolt, and the position of the housing is locked through the match between the bolt and the threaded hole after the position on the to-be-measured object is well adjusted.

The charge output structure includes:

a bracket structure, including a supporting part and a cylindrical connecting part which is molded on the supporting part, wherein the connecting part is provided with a second installation hole which extends axially along the connecting part, and an installation plane of the supporting part in the installation chamber is vertical to the plane in which the cable connector is located;

a piezoelectric element, sleeved outside the connecting part, wherein a gap is formed between the piezoelectric element and the connecting part;

a mass block, sleeved outside the piezoelectric element and arranged above the supporting part in a suspended manner;

a pretightening piece, connected within the gap; and a fastening piece, wherein a rod part of the fastening piece is in cooperation with the second installation hole to lock the bracket structure, the piezoelectric element and the mass block, and a head part of the fastening piece butts against the pretightening piece, such that the pretightening piece provides a radial pretightening force to fasten the bracket structure, the piezoelectric element and the mass block.

The diameter of the connecting part gradually decreases from bottom to top, and correspondingly, the pretightening piece is a circular wedge structure.

The pretightening piece includes at least two wedge blocks, and the wedge blocks are in butt joint with each other to form the circular wedge structure.

The piezoelectric element includes at least two piezoelectric blocks, and the piezoelectric blocks are in butt joint with each other to form a circular piezoelectric element.

The mass block has a circular structure which includes an inner ring surface and an outer ring surface, wherein the inner ring surface includes a first inner ring surface and a second inner ring surface, the inner diameter of the second inner ring surface is greater than the inner diameter of the first inner ring surface, a step surface is formed at the position where the first inner ring surface is connected with the second inner ring surface, and the mass block is arranged outside the piezoelectric element in a hanging manner via the step surface.

The piezoelectric element is arranged above the supporting part in a suspended manner.

The technical solutions of the present invention have the following advantages:

1. As to the piezoelectric acceleration sensor provided by the present invention, the housing position can be adjustably connected to a to-be-measured object via an adjustment structure, such that the cable connector can keep away from the position of obstacles, and the position of the cable connector can be flexibly adjusted, thereby facilitating installation.

2. As to the piezoelectric acceleration sensor provided by the present invention, the adjustment structure is configured to lock the housing and the to-be-measured object after the housing rotates to a target position relative to the to-be-measured object. Through only one structure, the position of the housing relative to the to-be-measured object can be adjusted, and the housing and the to-be-measured object can also be locked, therefore, the structure is simple and compact.

3. As to the piezoelectric acceleration sensor provided by the present invention, the to-be-measured object is provided with a threaded hole; the adjustment structure includes a first installation hole and a bolt arranged on the housing, wherein the bolt is applicable to penetrate through the first installation hole to be connected with the threaded hole in a matching manner, the housing rotates around the bolt, and the position of the housing is locked through the match between the bolt and the threaded hole after the position on the to-be-measured object is well adjusted. Therefore, the structure is simple and compact and the processing is convenient.

4. As to the piezoelectric acceleration sensor provided by the present invention, the charge output structure includes: a bracket structure which includes a supporting part and a cylindrical connecting part which is molded on the supporting part, wherein the connecting part is provided with a second installation hole which extends axially along the connecting part, and an installation plane of the supporting part in the installation chamber is vertical to the plane in which the cable connector is located; a piezoelectric element which is sleeved outside the connecting part, wherein a gap is formed between the piezoelectric element and the connecting part; a mass block which is sleeved outside the piezoelectric element and arranged above the supporting part in a suspended manner; a pretightening piece which is connected within the gap; and a fastening piece, wherein a rod part of the fastening piece is in cooperation with the second installation hole to lock the bracket structure, the piezoelectric element and the mass block, and a head part of the fastening piece butts against the pretightening piece, such that the pretightening piece provides a radial pretightening force to fasten the bracket structure, the piezoelectric element and the mass block. Under an extrusion from the fastening piece, the pretightening piece will expand outwards to extrude the piezoelectric element, while the mass block is sleeved outside the piezoelectric element to prevent the piezoelectric element from expanding, such that the charge output structures extrude mutually in the installation process of the fastening piece, in addition, the parts cooperate with each other closely, thereby improving contact stiffness of the overall structure and improving frequency response characteristics and resonance of the overall structure. As no viscose is needed, the installation period of charge output elements is effectively shortened.

5. As to the piezoelectric acceleration sensor provided by the present invention, the diameter of the connecting part gradually decreases from bottom to top, and correspondingly, the pretightening piece is a circular wedge structure, and in the installation process of the bolt, the pretightening piece moves from top to bottom to extrude the piezoelectric element horizontally, thereby achieving the purpose of tight fit.

6. As to the piezoelectric acceleration sensor provided by the present invention, the pretightening piece includes at least two wedge blocks, and the wedge blocks are in butt joint with each other to form the circular wedge structure, thereby facilitating installation of the pretightening piece.

7. As to the piezoelectric acceleration sensor provided by the present invention, the piezoelectric element includes at least two piezoelectric blocks, and the piezoelectric blocks are in butt joint with each other to form a circular piezoelectric element, thereby facilitating installation of the piezoelectric element.

8. As to the piezoelectric acceleration sensor provided by the present invention, the mass block has a circular structure which includes an inner ring surface and an outer ring surface, wherein the inner ring surface includes a first inner ring surface and a second inner ring surface, the inner diameter of the second inner ring surface is greater than the inner diameter of the first inner ring surface, a step surface is formed at the position where the first inner ring surface is connected with the second inner ring surface, and the mass block is arranged outside the piezoelectric element in a hanging manner via the step surface, thereby facilitating the mass block to exert a shearing force on the piezoelectric element.

9. As to the piezoelectric acceleration sensor provided by the present invention, the piezoelectric element is arranged above the supporting part in a suspended manner, such that the piezoelectric element can rapidly generate electric signals when the piezoelectric element is subjected to a shearing force exerted by the mass block, thereby improving sensitivity.

BRIEF DESCRIPTION OF THE DRAWINGS

In order to more clearly describe specific embodiments of the present invention or technical solutions in the prior art, a brief introduction will be given below on the accompanying drawings which need to be used in the description of specific embodiments or in the prior art. Apparently, the accompanying drawings described below are some embodi

REFERENCE NUMERALS

1—housing; 2—cable connector; 3—bolt;
4—first installation hole; 5—bracket structure; 6—piezoelectric element;
7—pretightening piece; 8—mass block; 9—fastening piece;
10—second installation hole; 61—piezoelectric block; 71—wedge block.

DETAILED DESCRIPTION OF THE EMBODIMENTS

A clear and complete description will be given below on the technical solutions of the present invention in combination with the accompanying drawings. Apparently, the described embodiments are merely a part, but not all, of the embodiments of the present invention. Based on the embodiments in the present invention, all the other embodiments obtained by those skilled in the art without any creative effort shall all fall within the protection scope of the present invention.

In the description of the present invention, it should be noted that, the directional or positional relationship indicated by such terms as "center" "upper", "lower", "left", "right", "vertical", "horizontal", "inner" and "outer" is the directional or positional relationship shown based on the drawings, which is merely for convenient and simplified description of the present invention, rather than indicating or implying that the referred device or element must have the specific direction or must be constructed and operated in the specific direction, therefore, it cannot be understood as a limitation to the present invention. In addition, such terms as "first", "second" and "third" are merely for the purpose of description, rather than being understood as indicating or implying relative importance.

In the description of the present invention, it should be noted that, unless otherwise definitely prescribed and defined, the terms "installation", "connection", "connected" and the like should be understood in its broad sense. For example, the "connection" may be a fixed connection, may also be a detachable connection or an integrated connection; may be a mechanical connection, may also be an electrical connection; and the "connected" may be directly connected and can also be indirectly connected through an intermediate medium, and can also be the internal communication inside two elements. The specific meaning of the above-mentioned terms in the present invention may be understood by those of ordinary skill in the art in light of specific circumstances.

In addition, the technical solutions in different embodiments of the present invention described below can be combined with each other as long as the technical solutions do not constitute a conflict.

Embodiment 1

Figure 1:
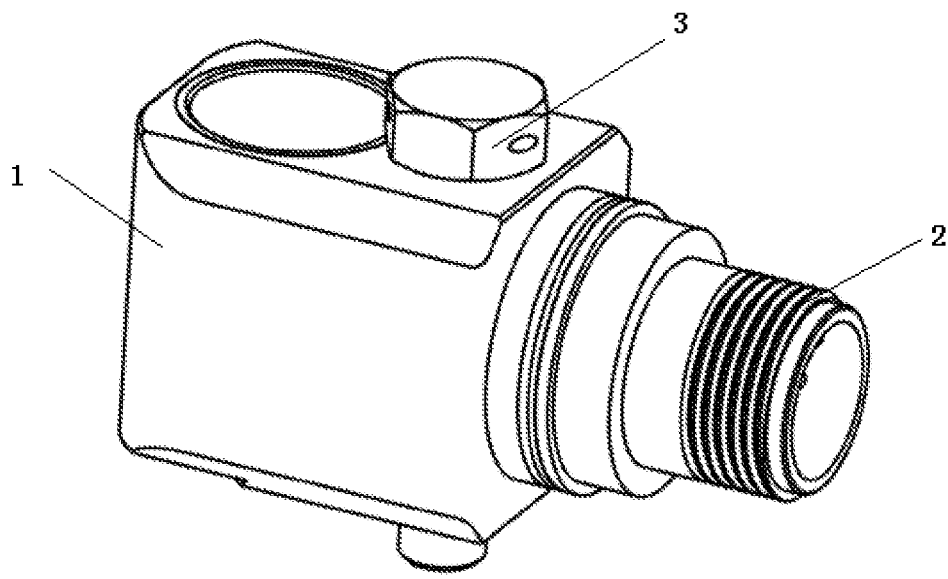
- FIG. 1 is a structural schematic diagram of a piezoelectric acceleration sensor provided by a first embodiment of the present invention.
Figure 2:
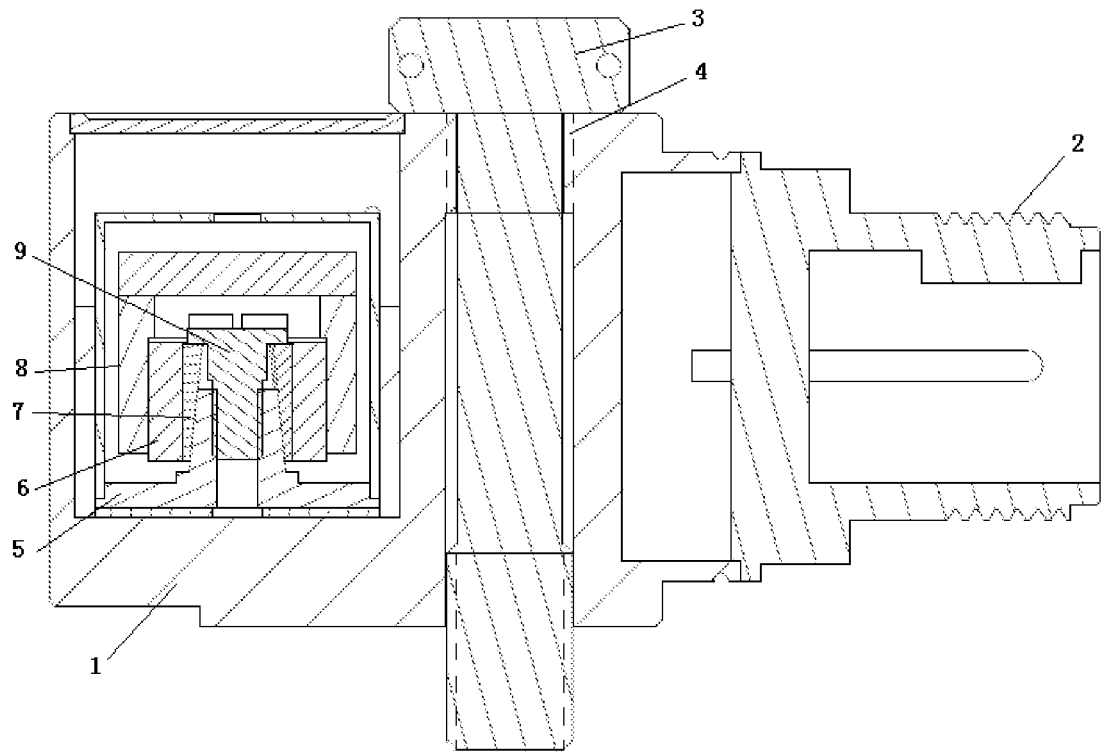
FIG. 2 is a sectional view of a piezoelectric acceleration sensor as shown in FIG. 1.
Figure 3:
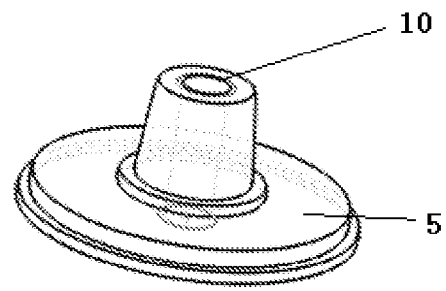
FIG. 3 is a structural schematic diagram of a bracket structure as shown in FIG. 2.
Figure 4:
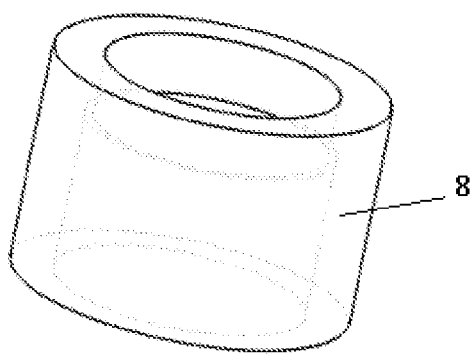
FIG. 4 is a structural schematic diagram of a mass block as shown in FIG. 2.
Figure 5:
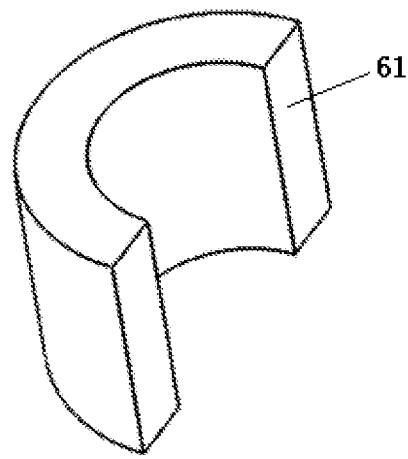
FIG. 5 is a structural schematic diagram of a piezoelectric block as shown in FIG. 2.
Figure 6:
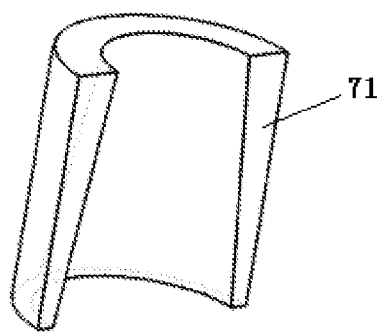
FIG. 6 is a structural schematic diagram of a wedge block as shown in FIG. 2.
Figure 7:
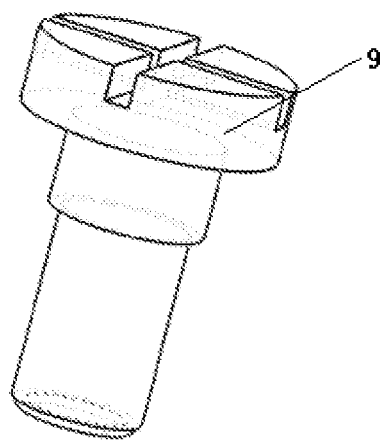
FIG. 7 is a structural schematic diagram of a fastening piece as shown in FIG. 2.

FIG. 1 and FIG. 2 show one specific embodiment of a piezoelectric acceleration sensor. The piezoelectric acceleration sensor includes a housing 1, wherein the housing 1 is internally molded with an installation chamber, and one side face of the housing 1 is provided with a cable connector 2. A charge output structure which is configured to induce vibration and output electric signals is installed in the installation chamber, wherein the charge output structure is electrically connected with the cable connector 2. The housing 1 is provided with two first installation holes 4, the bolt 3 penetrates through the first installation hole 4, the to-be-measured object is provided with a threaded hole, the axis in which the bolt 3 is located is set to be in parallel with the axial direction of the charge output structure, the housing 1 can rotate around the bolt 3, and the position of the housing 1 is locked through the match between the bolt 3 and the threaded hole after the position on the to-be-measured object is well adjusted. The first installation hole 4 and the bolt 3 form an adjustment structure which is configured to adjustably connect the position of the housing 1 to the to-be-measured object so as to adjust the relative position between the to-be-measured object and the cable connector 2. In the present embodiment, as shown in FIG. 2 to FIG. 7, the charge output structure includes a bracket structure 5, a piezoelectric element 6, a mass block 8, a pretightening piece 7 and a fastening piece 9, wherein the bracket structure 5 includes a supporting part and a cylindrical connecting part which is molded on the supporting part, the diameter of the cylindrical connecting part decreases gradually from bottom to top, the cylindrical connecting part is provided with a second installation hole 10 which extends axially along the connecting part, and an installation plane of the supporting part in the installation chamber is vertical to the plane in which the cable connector 2 is located. The piezoelectric element 6 includes two semi-circular piezoelectric blocks 61, wherein the two piezoelectric blocks 61 are in butt joint with each other to form a circular piezoelectric element 6, and a circular gap which is large on the top and small in the bottom is formed between the piezoelectric element 6 and the connecting part. The pretightening piece 7 is connected within the circular gap. In the present embodiment, to facilitate installation, the pretightening piece 7 includes two wedge blocks 71, the wedge blocks 71 are in butt joint with each other to form a circular wedge structure, and the mass block 8 is sleeved outside the piezoelectric element 6 and is arranged above the supporting part in a suspended manner A rod part of the fastening piece 9 is in cooperation with the second installation hole 10 to lock the bracket structure 5, the piezoelectric element 6 and the mass block 8, and a head part of the fastening piece 9 butts against the pretightening piece 7, such that the pretightening piece 7 provides a radial pretightening force to fasten the bracket structure 5, the piezoelectric element 6 and the mass block 8. To facilitate the mass block 8 to exert a shearing force on the piezoelectric element 6 and to enable the piezoelectric element 6 to rapidly generate electric signals when the piezoelectric element 6 is subjected to the shearing force exerted by the mass block 8, in the present embodiment, as shown in FIG. 4, the mass block 8 has a circular structure which includes an inner ring surface and an outer ring surface, wherein the inner ring surface includes a first inner ring surface and a second inner ring surface, the inner diameter of the second inner ring surface is greater than the inner diameter of the first inner ring surface, a step surface is formed at the position where the first inner ring surface is connected with the second inner ring surface, and the mass block 8 is arranged outside the piezoelectric element 6 in a hanging manner via the step surface. The piezoelectric element 6 is arranged above the supporting part in a suspended manner.

During specific installation and use, after the pretightening piece 7, the piezoelectric element 6 and the mass block 8 are installed on the bracket structure 5, the fastening piece 9 is installed in the second installation hole 10, and in the process of cooperating with the second installation hole 10, the rod part of the fastening piece 9 cooperates to lock the bracket structure 5, the piezoelectric element 6 and the mass block 8. The head part of the fastening piece 9 butts against an upper end of the pretightening piece 7, such that the pretightening piece 7 moves from top to bottom to extrude the piezoelectric element 6 horizontally, while the mass block 8 is sleeved outside the piezoelectric element 6 to prevent the piezoelectric element 6 from expanding, such that the charge output structures extrude mutually in the installation process of the fastening piece 9, in addition, the parts cooperate with each other closely, thereby improving contact stiffness of the overall structure. As no viscose is needed, the installation period of charge output elements is effectively shortened. When the piezoelectric acceleration sensor is connected to the to-be-measured object, the housing 1 is enabled to rotate axially around the bolt 3, so as to adjust the position of the cable connector 2, and to keep away from obstacles easily. After the position is well adjusted, the bolt 3 is in cooperation with the threaded hole on the to-be-measured object to lock the position of the housing 1.

In a substitutable embodiment, the piezoelectric element 6 includes more than two piezoelectric blocks 61, and the pretightening piece 7 includes more than two wedge blocks 71.

Apparently, the above embodiments are merely examples given for the purpose of clear description, rather than for limiting the embodiments. For those skilled in the art, other various variations or modifications can be made on the basis of the above description. There's no need and also no possibility to enumerate all the embodiments herein, while the apparent variations or modifications derived herein shall still fall within the protection scope of the present invention.

The invention claimed is:

1. A piezoelectric acceleration sensor, comprising:
a housing, wherein the housing is internally molded with an installation chamber, and one side face of the housing is provided with a cable connector;
an adjustment structure, configured to adjustably connect the housing position to a to-be-measured object, so as to adjust the relative position between the to-be-measured object and the cable connector; and
a charge output structure, installed in the installation chamber and configured to induce vibration and output electric signals, wherein the charge output structure is electrically connected with the cable connector;
wherein the charge output structure comprises:
a bracket structure, comprising a supporting part and a cylindrical connecting part which is molded on the supporting part, wherein the connecting part is provided with a second installation hole which extends axially along the connecting part, and an installation plane of the supporting part in the installation chamber is vertical to the plane in which the cable connector is located;
a piezoelectric element, sleeved outside the connecting part, wherein a gap is formed between the piezoelectric element and the connecting part;
a mass block, sleeved outside the piezoelectric element and arranged above the supporting art in a suspended manner;
a pretightening piece, connected within the gap; and
a fastening piece, wherein a rod part of the fastening piece is in cooperation with the second installation hole to lock the bracket structure, the piezoelectric element and the mass block, and a head part of the fastening piece butts against the pretightening piece, such that the pretightening piece provides a radial pretightening force to fasten the bracket structure, the piezoelectric element and the mass block.

2. The piezoelectric acceleration sensor of claim 1, wherein the adjustment structure is configured to lock the housing and the to-be-measured object after the housing rotates to a target position relative to the to-be-measured object.

3. The piezoelectric acceleration sensor of claim 2, wherein an axial direction of the charge output structure is set to be in parallel with an axial direction in which the housing rotates.

4. The piezoelectric acceleration sensor of claim 2, wherein
the to-be-measured object is provided with a threaded hole;
the adjustment structure comprises:
a first installation hole and a bolt arranged on the housing, wherein the bolt is applicable to penetrate through the first installation hole to be connected with the threaded hole in a matching manner, the housing rotates around the bolt, and the position of the housing is locked through the match between the bolt and the threaded hole after the position on the to-be-measured object is well adjusted.

5. The piezoelectric acceleration sensor of claim 1, wherein the diameter of the connecting part gradually decreases from bottom to top, and correspondingly, the pretightening piece is a circular wedge structure.

6. The piezoelectric acceleration sensor of claim 5, wherein the pretightening piece comprises at least two wedge blocks, and the wedge blocks are in butt joint with each other to form the circular wedge structure.

7. The piezoelectric acceleration sensor of claim 1, wherein the piezoelectric element comprises at least two piezoelectric blocks, and the piezoelectric blocks are in butt joint with each other to form a circular piezoelectric element.

8. The piezoelectric acceleration sensor of claim 7, wherein the mass block has a circular structure which includes an inner ring surface and an outer ring surface, wherein the inner ring surface includes a first inner ring surface and a second inner ring surface, the inner diameter of the second inner ring surface is greater than the inner diameter of the first inner ring surface, a step surface is formed at the position where the first inner ring surface is connected with the second inner ring surface, and the mass block is arranged outside the piezoelectric element in a hanging manner via the step surface.

9. The piezoelectric acceleration sensor of claim 8, wherein the piezoelectric element is arranged above the supporting part in a suspended manner.

* * * * *